US008627570B2

(12) United States Patent
Takamizawa

(10) Patent No.: US 8,627,570 B2
(45) Date of Patent: Jan. 14, 2014

(54) ROLLER THRUST BEARING CAGE AND MANUFACTURING METHOD THEREOF

(75) Inventor: Wataru Takamizawa, Tokyo (JP)

(73) Assignee: JTEKT Corporation, Chuo-Ku, Osaka (JP)

(*) Notice: Subject to any disclaimer, the term of this patent is extended or adjusted under 35 U.S.C. 154(b) by 128 days.

(21) Appl. No.: 12/923,791

(22) Filed: Oct. 7, 2010

(65) Prior Publication Data

US 2011/0023304 A1 Feb. 3, 2011

Related U.S. Application Data

(62) Division of application No. 11/272,759, filed on Nov. 15, 2005, now Pat. No. 7,837,394.

(30) Foreign Application Priority Data

Nov. 16, 2004 (JP) ................................. P2004-331782

(51) Int. Cl.
*B21D 53/12* (2006.01)
*B21K 1/05* (2006.01)

(52) U.S. Cl.
USPC ........ 29/898.067; 29/898; 384/572; 384/580; 384/623

(58) Field of Classification Search
USPC .............. 29/898, 898.067; 384/572, 580, 623
See application file for complete search history.

(56) References Cited

U.S. PATENT DOCUMENTS

| 2,117,633 | A | | 5/1938 | Smith | |
| 2,978,282 | A | | 4/1961 | Fisher | |
| 3,221,390 | A | * | 12/1965 | Pitner | 29/898.067 |
| 3,228,090 | A | * | 1/1966 | Schaeffler | 29/898.067 |
| 3,256,585 | A | * | 6/1966 | Ripple | 29/898.067 |
| 3,365,775 | A | * | 1/1968 | Cavagnero et al. | 29/898.067 |
| 3,526,026 | A | * | 9/1970 | Warchol | 29/898.067 |
| 3,535,964 | A | * | 10/1970 | Ahlman | 83/697 |
| 3,778,124 | A | | 12/1973 | Alling | |
| 3,785,710 | A | | 1/1974 | Alling | |
| 3,797,083 | A | * | 3/1974 | Schaeffler et al. | 29/898.067 |

(Continued)

FOREIGN PATENT DOCUMENTS

| FR | 1 489 628 | 11/1967 |
| JP | 1-307516 | 12/1989 |

(Continued)

OTHER PUBLICATIONS

Notification of Reason(s) for Refusal dated Jul. 14, 2009, with English translation.

(Continued)

*Primary Examiner* — Alexander P Taousakis
(74) *Attorney, Agent, or Firm* — McGinn Intellectual Property Law Group, PLLC

(57) ABSTRACT

A manufacturing method of a roller bearing cage, including a cage main body formed with an annular plate, and a plurality of cage pockets opened along a circumferential direction on the cage main body for retaining rollers having flat end faces, includes punching an annular plate from a metal, forming a plurality of cage pockets on the annular plate, and pressing an edge of one of the cage pockets in a thickness direction of the annular plate on a side face of the one of the cage pockets with a press jig having a pressing face of a predetermined shape to form a chamfered portion.

20 Claims, 6 Drawing Sheets

(56) References Cited

U.S. PATENT DOCUMENTS

| | | | |
|---|---|---|---|
| 3,802,754 A | 4/1974 | Pitner | |
| 3,878,705 A * | 4/1975 | Iffland | 72/333 |
| 4,154,491 A | 5/1979 | Derner et al. | |
| 4,320,565 A * | 3/1982 | Warchol | 29/898.067 |
| 5,862,592 A * | 1/1999 | Harimoto et al. | 29/898.067 |
| 6,330,748 B1 * | 12/2001 | Muntnich et al. | 29/898.067 |
| 6,367,983 B1 * | 4/2002 | Muntnich et al. | 384/580 |
| 2007/0206894 A1 * | 9/2007 | Kotani et al. | 384/623 |

FOREIGN PATENT DOCUMENTS

| | | |
|---|---|---|
| JP | 7-60379 | 3/1995 |
| JP | 10-220482 | 8/1998 |
| JP | 10-252654 | 9/1998 |
| JP | 2002-250347 | 9/2002 |
| JP | 2003-120684 | 4/2003 |
| JP | 2004-211824 | 7/2004 |
| JP | 2004-211835 | 7/2004 |
| JP | 2005-195086 | 7/2005 |

OTHER PUBLICATIONS

European Search Report dated Jun. 3, 2008.

* cited by examiner

RADIAL DIRECTION

CIRCUMFERENTIAL DIRECTION

ROLLER THRUST BEARING CAGE AND MANUFACTURING METHOD THEREOF

The present application is a Divisional Application of U.S. patent application Ser. No. 11/272,759, filed on Nov. 15, 2005, now U.S. Pat. No. 7,837,394 which is based on and claims priority from Japanese patent application No. 2004-331782, filed on Nov. 16, 2004, the entire contents of which are incorporated herein by reference.

BACKGROUND OF THE INVENTION

1. Field of the invention

The present invention relates to roller bearing cages such as needle roller thrust bearings etc. More specifically, the invention relates to roller bearing cages such as needle roller thrust bearings etc. that are used in an automatic transmission of automobile, a compressor of a vehicle air conditioner or the like.

2. Description of the Related Art

Trend for low fuel consumption of automobile in recent years has increased demands for further weight saving and further reduction of rotational torque to the roller thrust bearings that are mounted in various parts such as automatic transmission in the vehicle more and more. For weight saving, a cage made of resin has been proposed. For reduction of rotational torque, there has been proposed a cage in which projections are formed at central parts in the circumferential direction on opposite inner faces of the cage pocket over the thickness direction of the cage (width direction of assembly) to pivotally support a roller by contacting with circumferential central portions on end faces of the roller on inner and outer circumferential sides (See Japanese Patent Publication No. JP 2004-211824A). In the cage disclosed in JP 2004-211824A, by providing the projections in opposite inner faces of the cage pocket, the reduction of rotational torque can be accomplished because contact area between the opposite inner faces and the end faces of the roller is reduced. However, in such the cage, due to limitation in machining shape of punching die for the cage pocket, the projections must extends over the thickness direction of the cage. Accordingly, a linear contact area between the projections and the end faces of the roller in the thickness direction is increased, and contact portions are exposed to a large difference in contact speeds in the thickness direction. As a result, in such the structure, abnormal wear (drilling wear) can easily occur on the inner faces of the cage pocket. As the cage disclosed in JP 2004-211824A is made of metal, the thickness of the cage can be made relatively thin, so that the length of the linear contact of the projection can be made small. However, if the cage is made of resin for saving weight, the thickness of the cage is increased in order to secure strength of the cage and also, due to limitation in shape to provide draft for releasing resin formation mold, the projection must be made to extend more in the thickness direction of the cage as compared with the metal cage. Accordingly, the difference in the contact speeds between the projection and the end face of the roller is further increased, and the drilling wear as discussed above becomes more considerable.

SUMMARY OF THE INVENTION

One of the problems to be solved in the present invention is to obtain weight saving and reduction in rotational torque in a roller thrust bearing while suppressing drilling wear as described foregoing in either cases that the cage is made of metal or resin. In particular, in a case that the thickness of the cage must be large because the cage is made of resin, or the like, the invention provides a roller bearing cage that can contribute to further weight saving and reduction in rotational torque of the roller bearing while having significant effect on suppressing the drilling wear.

The invention provides a roller bearing cage that includes a cage main body formed with an annular plate, and a plurality of cage pockets opened so as to be arranged along a circumferential direction on the cage main body for retaining rollers having flat end faces;

wherein a projection to pivotally support an end face of the corresponding roller is projected at a central portion in the circumferential direction on a radial inner face of each cage pocket, the projection extends in a thickness direction of the cage main body, and includes a contact portion that is brought into a contact with a central portion or a vicinity thereof on the end face of the roller, and a non-contact portion that is adjacent to the contact portion in the thickness direction and that is not brought into contact with the end face of the roller.

In the cage according to the invention, in order to secure large load capacity to the roller seated in the cage pocket, the roller having flat end faces is retained, and in order to reduce frictional resistance by contact between the inner faces of the cage pocket and the end faces of the roller, a projection is formed at least at the circumferential central part on the inner face of the cage pocket (namely, circumferential side face of the cage pocket). The projection has a shape extending in the thickness direction to secure draft for releasing the cage from the formation mold. More specifically, the projection extends in the thickness direction at the circumferential central portion and a flat portion formed in the central part of the projection linearly extends in the thickness direction. By such the structure, if non-contact portion is not formed, the contact area between the projection on the inner face of the cage pocket and the end face of the roller would be formed linearly in the thickness direction causing circumferential speed difference. In such a state, a drilling wear can easily occur.

Under foregoing circumstances, according to the invention, the projection includes a contact portion that is brought into a contact with a central portion or a vicinity thereof on the end face of the roller, and a non-contact portion that is adjacent to the contact portion in the thickness direction and that is not brought into contact with the end face of the roller. Therefore, the projection is configured to reduce the contact area between the projection and the roller end face. As a result, according to the invention, the drilling wear due to the liner contact between the inner face of the cage pocket and the roller end face is reduced and it is possible to obtain a reduction in rotational torque. Further, according to the invention, in a case that the cage is made of resin for weight saving, even if the cage thickness is made thick to secure the cage strength and the projection is made long in the thickness direction of the cage, only the contact portion formed in a part of the projection is brought into linear contact with the roller end face. Accordingly it is possible to reduce or suppress the drilling wear and to obtain simultaneously the weight saving and reduction in rotational torque of the bearing in which the cage of the invention is mounted for low fuel consumption of an automobile.

Further, in a case that a semi-circle projection is formed on the inner face of the cage pocket to pivotally support the central portion on the roller end face by almost point contact, the difference in the circumferential speeds does not occur at the contact area between the projection and the roller end face. However, if the cage is moved in the thickness direction thereof, the projection and the central portion on the roller end face are offset to each other and non-contact therebetween occurs and the projection cannot pivotally support the roller. On the other hand, according to the invention, the flat portion may have a flat length that is at least almost equivalent to a displaceable distance of the cage in the thickness direction. By such the construction, even if the cage is moved in the thickness direction, the contact portion assuredly keeps a state that the contact portion is always brought into contact with the central portion on the roller end face, so that the roller in motion is pivotally supported and its smooth rotational motion is maintained.

The non-contact portion may include a chamfered portion formed on an edge of the projection in the thickness direction of the cage. The contact portion may include a flat portion having a flat face in the thickness direction of the cage in a central part of the projection. A pair of the chamfered portions may be formed on the opposite edges of the projection in the thickness direction of the cage.

The cage of the invention may be a needle roller bearing cage or a roller bearing cage other than needle roller bearing. The cage of the invention does not limit type of the bearing to which the cage is applied as far as the bearing is provided with a cage. The cage may be made of resin or may be made of metal. If the cage is made of resin, the thickness of the cage becomes relatively large. Therefore, the invention is specifically suitable for sufficiently suppressing the drilling wear in such the resin cage. If the cage is made of metal, although the cage thickness is relatively small, the invention is also suitable for suppressing the drilling wear by providing the non-contact portion in a part of the projection.

Second aspect of the invention is provided with a manufacturing method of a roller bearing cage including a cage main body formed with an annular plate, and a plurality of cage pockets opened so as to be arranged along a circumferential direction on the cage main body for retaining rollers having flat end faces, including punching an annular plate from a metal, forming a plurality of cage pockets on the annular plate, and pressing an edge of one of the cage pockets in a thickness direction of the annular plate on a side face of the cage pocket with a press jig having a pressing face of a predetermined shape to form a chamfered portion.

By such a manufacturing method of a roller bearing cage, a cage having the above-described construction and advantages can be obtained.

According to the invention, the drilling wear due to a contact between the inner face of the cage pocket and the roller end face is reduced and it is possible to obtain weight saving and reduction in rotational torque in the cage.

DETAILED DESCRIPTION OF THE PREFERRED EMBODIMENTS

Figure 1:
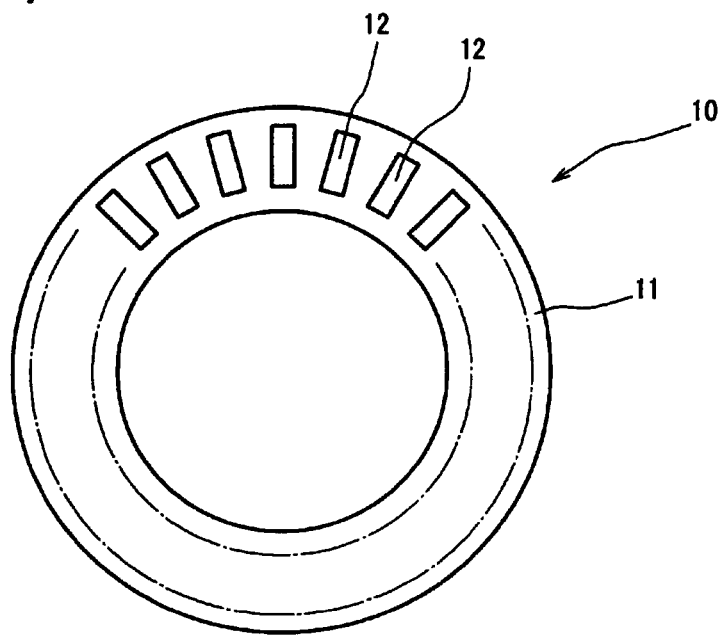
FIG. 1 is a partial plan view showing a roller bearing cage according to Embodiment 1.

Referring to the drawings, the description will be made on the roller bearing cages according to the embodiments of the invention. Although the roller bearing cages of the embodiments are applied to needle roller bearing cages, the invention is applicable other types of roller bearing cages.
(Embodiment 1)

Figure 2:
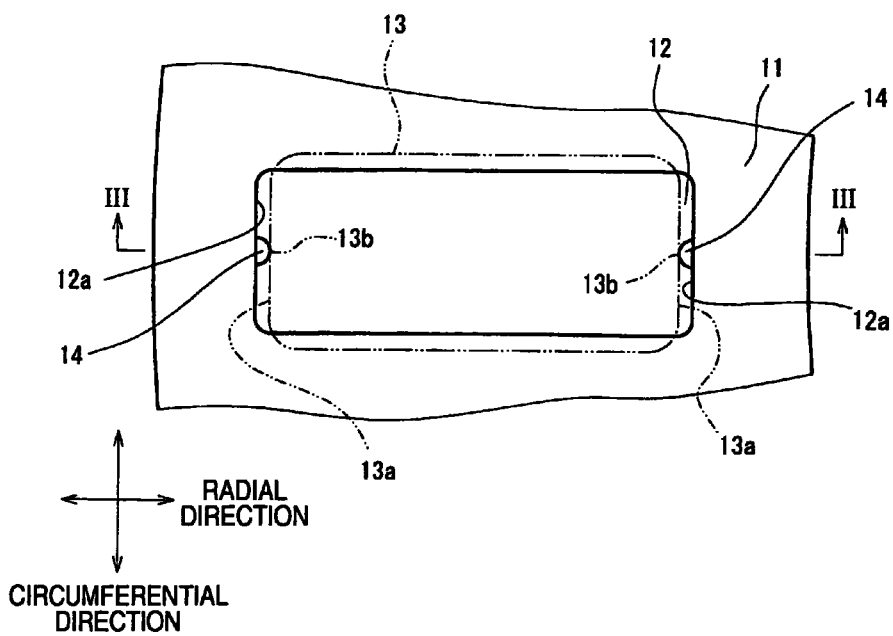
FIG. 2 is an enlarged plan view showing a vicinity of a cage pocket in FIG. 1.
Figure 3:
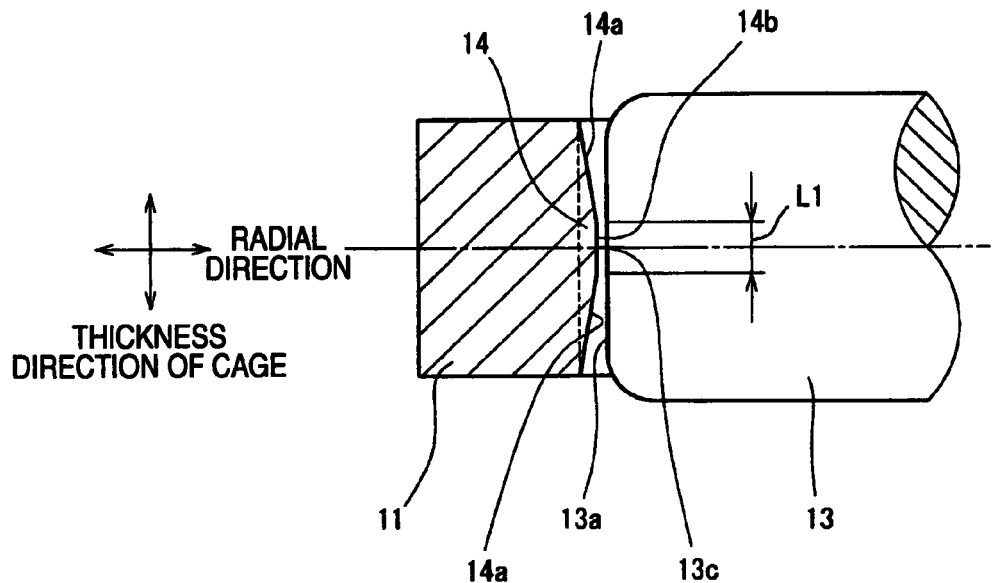
FIG. 3 is a sectional view taken on line of FIG. 2.
Figure 4:
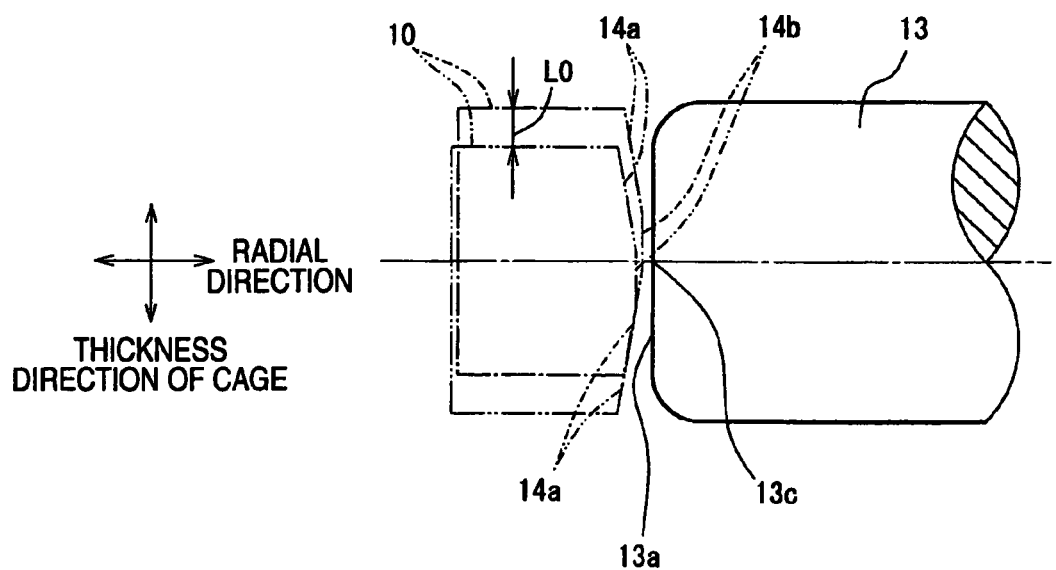
FIG. 4 is an explanatory view showing a displaceable amount in the thickness direction of the cage.

FIGS. 1 through 4 show the cage of Embodiment 1. FIG. 1 is a partial plan view showing a roller bearing cage, FIG. 2 is an enlarged plan view showing a vicinity of a cage pocket in FIG. 1, FIG. 3 is a sectional view taken on line of FIG. 2, and FIG. 4 is an explanatory view showing a displaceable amount in a thickness direction of the cage.

A cage 10 according to Embodiment 1 as shown in FIG. 1 includes a ring plate 11 having an annular shape and formed of a resin, on which cage pockets 12 for retaining rollers are formed at plural positions along circumferential direction. The cage pockets 12 are opened and arranged in a radial manner around the center of the cage at a constant pitch of a predetermined angle. Each cage pocket 12 is formed in a rectangular shape elongated slightly in the radial direction from the center of the cage in accordance with the roller length, and houses a roller 13 having flat end faces to obtain a large load capacity. Resin material for the ring plate 11 is not specifically limited if it is suitable in terms of the cage performance and cage strength etc. For example, the cage may be constituted by a material in which polyamide 66, polyamide 46, polyphenylene sulfide, thermoplastic polyimide or the like is served as matrix, and glass fiber, carbon fiber, aramid fiber or the like may be added in the matrix to improve the strength. Polyamide 66 is particularly suitable for material of the cage because it has excellent properties such as tensile strength and bending stiffness and has small coefficient of linear expansion.

A roller retaining portion (not-shown) for preventing the roller 13 from running off on a circumferential inner face 12a of the cage pocket 12. Projections 14 are formed on opposite radial inner faces 12a to reduce frictional resistance by contact between the inner faces 12a and end faces 13a of the roller 13.

Embodiment 1 is generally characterized by the shape of the projections 14. Referring to FIGS. 2 and 3, the shape of one of the projections 14 will be described in detail below. The projection 14 has a shape projecting into the cage pocket 12 at a central part in the circumferential direction on the inner surface 12a of the cage pocket 12 over a thickness direction (height direction) of the cage 10. The projection 14 has a curved surface shape such as semi-circle or semi-ellipse, so that the projection 14 is brought into a point contact with a circumferential central portion 13b on the roller end face 13a. The projection 14 extends in the thickness direction of the cage 10 between opposite edges of the inner surface 12a of the cage pocket 12. Opposite edges of the projection 14 are chamfered, so that a sectional shape of the projection 14 is constituted by chamfered portions (non-contact portions) 14a on the opposite edges and a flat portion (contact portion) 14b in the center part. In other words, the chamfered portions 14a are formed adjacent to the flat portion 14b in the thickness direction. Sectional shape of the chamfered portions 14a is not limited to straight, and it may be formed with a curved shape such as rounded shape. Chamfering angle of the chamfered portions 14a is not specifically limited. In a case that the cage 10 is formed by a conventional method such as injection molding, the opposite edges of the projection 14 may be formed in chamfered shapes serving as draft. Therefore, the cage 10 after formed can be easily drawn from the resin formation mold. The chamfered portions 14a of the projection 14 form non-contact portions that do not contact with the end face 13a of the roller 13. Although the non-contact portions are formed in a chamfered shape (rounded or tapered shape) in Embodiment 1, the non-contact portions may include a shape formed in a stepped manner with respect to the flat portion 14b. The non-contact portions may have a shape so as not to contact with the end face 13a of the roller 13, however, the shape of the chamfered portions 14a is preferable to serve as draft for being released from the mold after resin formation. By adjusting the chamfering angle of the chamfered portions 14a, a preferable draft for being released from the mold can be obtained.

The flat portion 14b constitutes a maximum projected part of the projection 14 into the cage pocket 12 so as to pivotally support the roller 13 which is seated in the cage pocket 12 by contacting with a central portion 13c in the thickness direction of the cage 10 on the end face 13a of the roller 13. The flat portion 14b of the projection 14 constitutes a contact portion that is brought into contact with a region including the central portion 13c on the end face 13a of the roller 13 so as to be in parallel with each other. Although the shape of the contact portion is constituted by a shape that is flat and in parallel with the end face 13a of the roller 13 in Embodiment 1, the contact portion may contain a slightly rounded shape at boundaries to the chamfered portions 14a so as to form continuity therebetween. It is preferable to avoid unnecessary frictional contact with the end face 13a of the roller 13 at the boundaries by forming continuity in shape change between the flat portion 14b and the chamfered portions 14a.

Referring to FIG. 4, the flat portion 14b is described more in detailed. In a case that the cage 10 of Embodiment 1 is mounted between an outer peripheral housing member and an inner peripheral side shaft member as a roller thrust bearing without race ring or a roller thrust bearing with race ring, it is assumed that the cage 10 is displaceable at a distance L0 in the thickness direction. In other words, the cage 10 is displaceable up to a first displacement position P1 shown with chain line on one side in the thickness direction, on the other hand, the cage 10 is displaceable up to a second displacement position P2 shown with chain double dashed line on the other side in the thickness direction. The distance between the positions P1 and P2 makes L0. The flat portion 14b has a flat length L1 that is at least almost equivalent to the above-described displaceable distance L0 in the thickness direction of the cage 10. Preferably, the flat portion 14b has a flat length L1 that is slightly longer than the above-described displaceable distance L0 in the thickness direction of the cage 10. Preferably, the flat length L1 of the flat portion 14b should be made as short as possible, so as to reduce frictional resistance by contact to the roller end face 13a and to reduce difference in circumferential speeds at the contact portion between the flat portion 14b and the roller end face 13a. In a case that the cage 10 is not displaced in the thickness direction, the flat length of the flat portion 14b should be made with a small length close to zero preferably. Namely, the projection 14 is preferably brought into almost point contact, while not pure point contact, to the central portion 13c in the thickness direction of the cage 10 on the end face 13a of the roller 13. However, the cage 10 is normally displaced in the thickness direction, the flat length L1 of the flat portion 14b is made almost equivalent to the displaceable distance L0 of the cage 10 in the thickness direction thereof in Embodiment 1.

Accordingly, in the cage 10 of Embodiment 1, in a case that the cage 10 is displaced to the first displacement position P1 on one side in the thickness direction, an end of the flat portion 14b of the projection 14 that is located on the other side in the thickness direction corresponds to the central portion 13c in the thickness direction on the roller end face 13a, whereas, in a case that the cage 10 is displaced to the second displacement position P2 on the other side in the thickness direction, another end of the flat portion 14b of the projection 14 that is located on one side in the thickness direction corresponds to the central portion 13c in the thickness direction on the roller end face 13a. As a result, the flat portion 14c can be in contact with the central portion 13c in the thickness direction on the roller end face 13a in any case that the cage 10 is displaced at any position in the thickness direction. Hence, the flat portion 14b assuredly keeps a state that the flat portion 147b is always brought into contact with the central portion 13c in the thickness direction on the roller end face 13a, so that the roller 13 in motion is pivotally supported and its smooth rotational motion is maintained.

In the cage 10 having the above described construction, the flat portion 14b to contact with the central portion 13c of the roller end face 13a at a part of the projection 14 and the flat length of the flat portion 14b is formed to as to be at least almost equivalent to the displaceable distance in the thickness direction of the cage 10. Hence only the part of the projection 14 is brought into linear contact with the central portion 13c in the thickness direction of the cage 10 on the roller end face 13a, so that a drilling wear is much reduced by reducing the area of the linear contact.

Further, in the cage 10, even if the cage 10 is made of resin and its thickness becomes relatively large, only the flat portion 14b that is the part of the projection 14 is brought into linear contact with the roller end face 13a. Hence, the drilling wear is suppressed and it is possible to reduce a rotational torque to be required.

(Embodiment 2)

Figure 5:
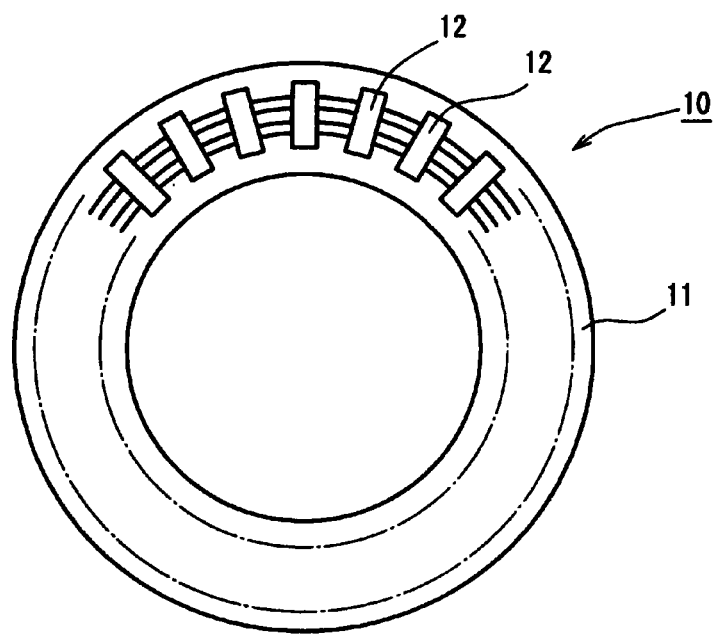
FIG. 5 is a partial plan view showing a roller bearing cage according to Embodiment 2.
Figure 6:
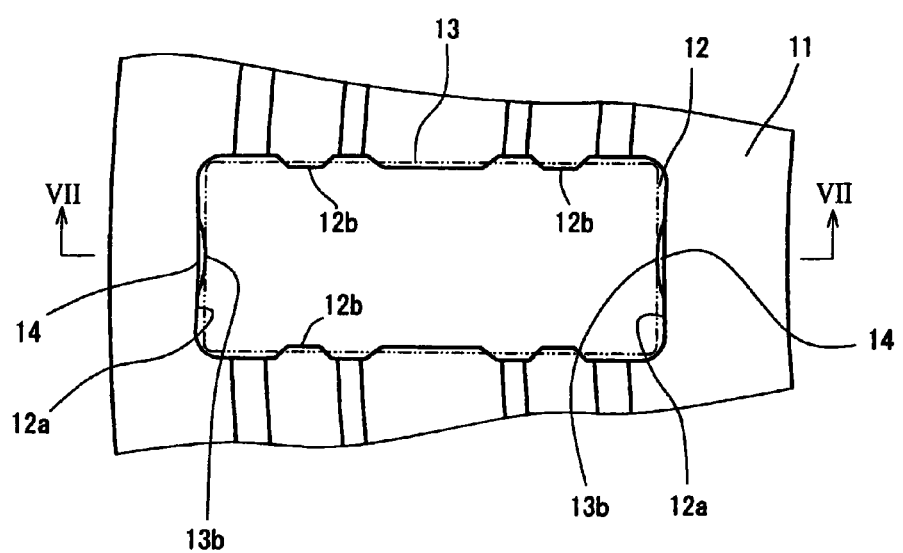
FIG. 6 is an enlarged plan view showing a vicinity of a cage pocket in FIG. 5.
Figure 7:
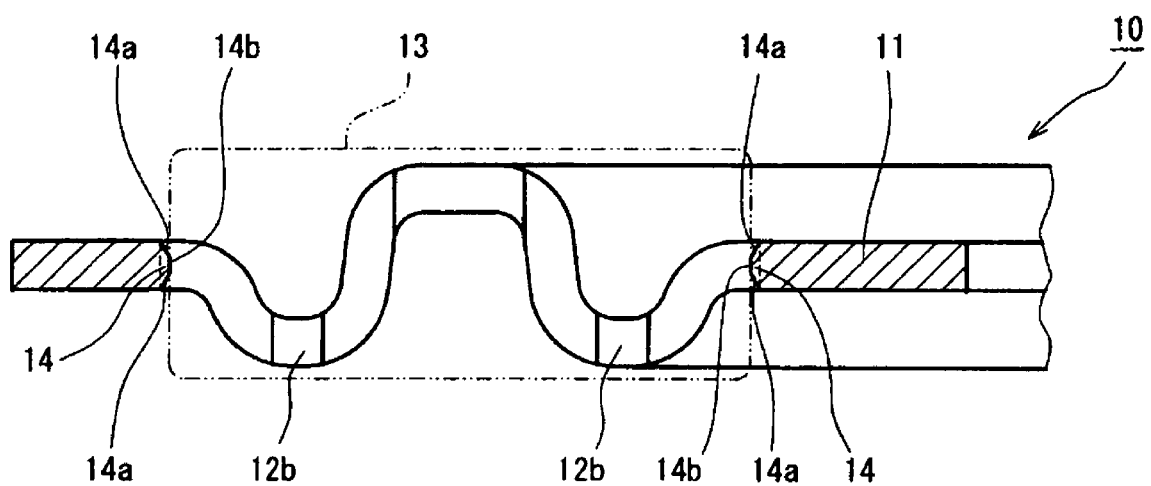
FIG. 7 is a sectional view taken on line VII-VII of FIG. 6.
Figure 8A:
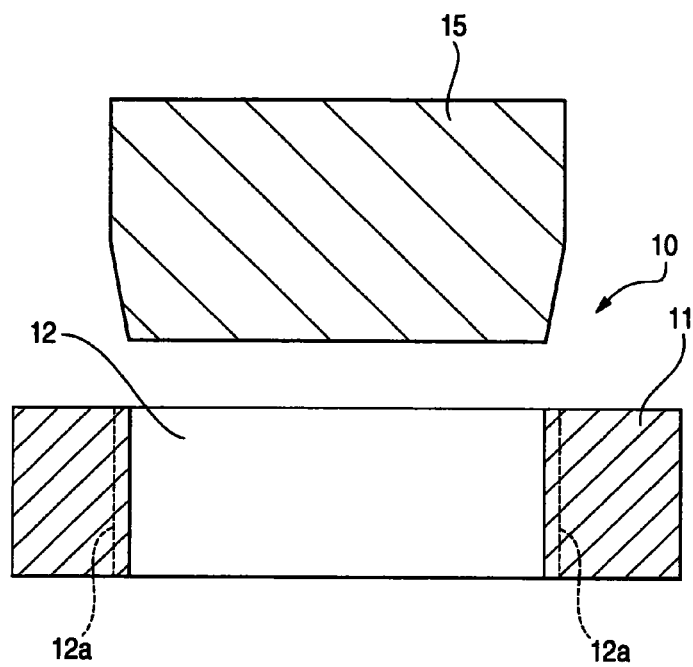
FIGS. 8A through 8C show a process forming chamfered portions of the cage of FIG. 5.
Figure 8B:
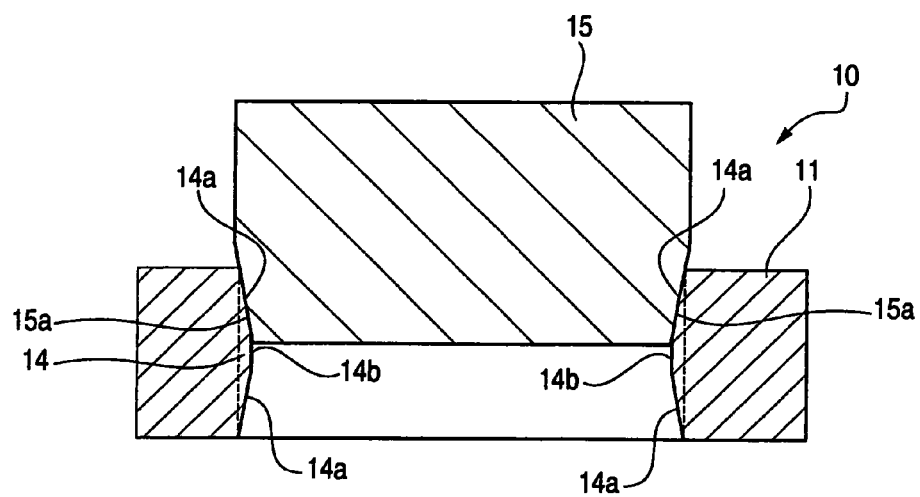
Figure 8C:
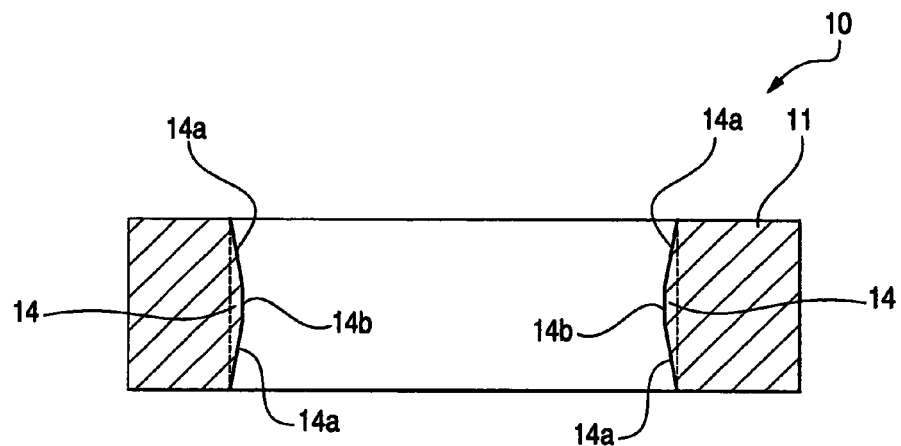
Figure 8D:
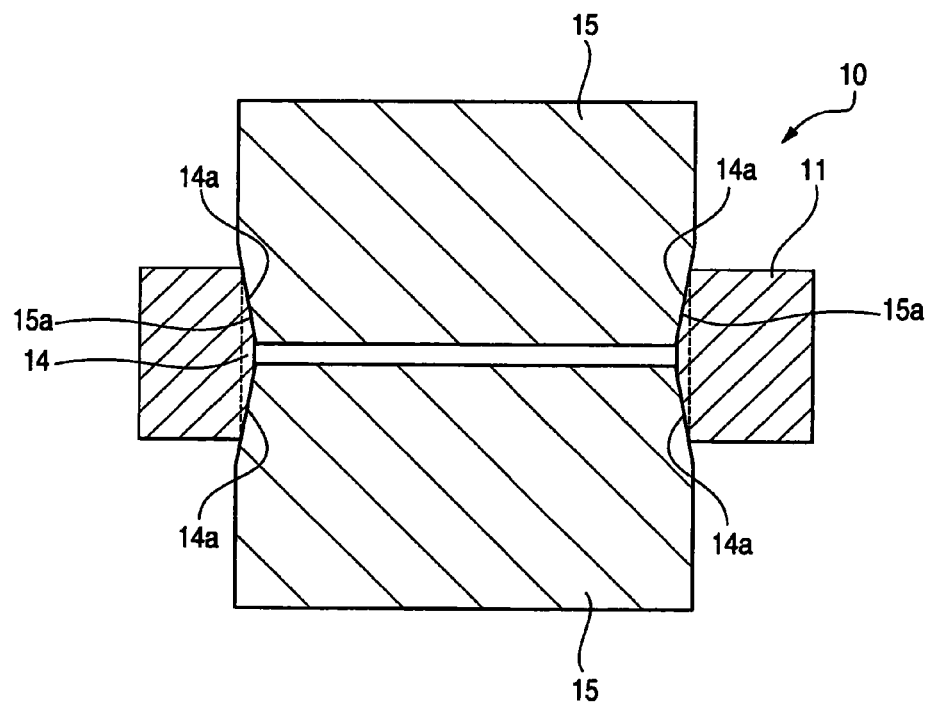
FIG. 8D shows a modification of the process forming the chamfered portions of the cage.

FIGS. 5 through 8D show the cage according to Embodiment 2. FIG. 5 is a plan view showing a roller bearing cage, FIG. 6 is an enlarged plan view showing a vicinity of a cage pocket in FIG. 5, FIG. 7 is a sectional view taken on line VII-VII of FIG. 6, FIGS. 8A through 8C show a process forming chamfered portions of the cage of FIG. 5, and FIG. 8D shows a modification of the process forming the chamfered portions of the cage.

Referring to FIGS. 5 through 7, the cage 10 shown in these drawings includes a ring plate 11 formed from a metal like light alloy etc. or a steel plate by punching. The ring plate 11 has a W-shaped section in the radial direction and plurality of roller retaining cage pockets 12 are formed in a radial manner around the center of the cage 10. The cage pockets 12 are opened and formed simultaneously at the forming of the ring plate 11 by punching. Further, a roller retaining portion 12b is formed on a circumferential inner face 12a. On a radial inner face 12a, a projection 14 is formed similarly to Embodiment 1.

Similarly to Embodiment 1, the projection 14 has a shape projecting into the cage pocket 12 at a central part in the circumferential direction on the inner surface 12a of the cage pocket 12 over a thickness direction of the cage 10. Opposite edges of the projection 14 in the thickness direction are chamfered, so that a sectional shape of the projection 14 is constituted by chamfered portions (non-contact portions) 14a on the opposite edges and a flat portion (contact portion) 14b that is flat in the thickness direction. The flat portion 14b is constituted to pivotally support a roller 13 which is seated in the cage pocket 12 by contacting with a central portion 13c in the thickness direction on an end face 13a of the roller 13.

The flat portion 14b of the projection 14 has a flat length L1 that is at least almost equivalent to a displaceable distance L0 in the thickness direction of the cage 10. Accordingly, in a case that the cage 10 is displaced to the first displacement position on one side in the thickness direction, or in a case that the cage 10 is displaced to the second displacement position on the other side in the thickness direction, the flat portion 14b corresponds to the central portion 13c in the thickness direction on the roller end face 13a. As a result, the flat portion 14c can be in contact with the central portion 13c in the thickness direction on the roller end face 13a in any case that the cage 10 is displaced at any position in the thickness direction.

In the cage 10 according to the above-described Embodiment 2, similarly to Embodiment 1, only the part of the projection 14 is brought into linear contact with the central portion 13c in the thickness direction of the cage 10 on the roller end face 13a, so that a drilling wear is much reduced by reducing the area of the linear contact.

The chamfered portions 14a may be formed by pressing an radial inner face of the cage pocket 12 formed by punching with an annular press jig 15 that is provided with a pressing face 15a having an angle corresponding to an chamfering angle of the chamfered portions 14a. In other words, as shown in FIG. 8A, the cage 10 and the press jig 15 are disposed in an opposite manner, and then opposite edges of the projection 14 in the thickness direction of the cage 10 are pressed with the press jig 15. Thus, the chamfered portions 14a are formed on the opposite edges of the projection 14 of the cage 10 as shown in FIG. 8C. The flat portion 14b is formed simultaneously to the formation of the chamfered portions 14a.

Incidentally, as shown in FIG. 8D, a pair of the press jigs 15 may be disposed in an opposite manner interposing the cage 10, and the opposite edges of the projection 14 in the thickness direction may be simultaneously pressed with the press jigs 15, so that the chamfered portions 14a and the flat portion 14b are simultaneously formed.

The invention is not limited by the foregoing embodiments. The invention should include various changes or modification within the scope of the claims.

What is claimed is:

1. A manufacturing method of a roller bearing cage including a cage main body formed with an annular plate, a plurality of cage pockets opened on the cage main body so as to be aligned along a circumferential direction of the annular plate, and the cage pockets configured to accommodate rollers having flat end faces, said method comprising:
    punching a metallic plate in an axial direction of the metallic plate;
    forming a plurality of cage pockets opened on the face of the annular plate; and
    pressing an edge of one of the cage pockets in a thickness direction of the annular plate with a press jig to form a chamfered portion and a flat portion on a side face of the one of the cage pockets, in a cross sectional view, the edge extending orthogonal to the radial direction so as to oppose one of the flat end faces of the rollers,
    wherein the press jig comprises a pressing face of a predetermined shape to form the chamfered portion,
    wherein the flat portion extends in the thickness direction, in a central part of the side face of the one of the cage pockets in the thickness direction, and
    wherein the chamfered portion is inclined to both of the radial direction and the thickness direction.

2. The manufacturing method of a roller bearing cage according to claim 1, wherein the cage pockets are simultaneously formed at the punching of the annular plate from the metal.

3. The manufacturing method of a roller bearing cage according to claim 1, wherein the flat portion is formed simultaneously at the forming of the chamfered portion by the pressing the edge of the one of the cage pockets in the thickness direction on the side face of the one of the cage pockets with the press jig.

4. The manufacturing method of a roller bearing cage according to claim 1, wherein opposite edges of the one of the cage pockets in the thickness direction are simultaneously pressed with a pair of press jigs, so that the flat portion and a pair of said chamfered portion adjacent to the flat portion are simultaneously formed.

5. The manufacturing method of a roller bearing cage according to claim 1, further comprising:
    forming another chamfered portion adjacent to the flat portion by the pressing the edge of the one of the cage pockets in the thickness direction on the side face of the cage pocket.

6. The manufacturing method of a roller bearing cage according to claim 5, wherein the flat portion is formed adjacent to the chamfered portion.

7. The manufacturing method of a roller bearing cage according to claim 5, wherein a length of the flat portion is at least equivalent to a displaceable distance in a thickness direction of the cage main body, said displaceable distance being defined as a distance that the roller bearing cage is displaced when the roller bearing cage is mounted between an outer peripheral housing member and an inner peripheral side shaft member.

8. The manufacturing method of a roller bearing cage according to claim 1, wherein the flat portion is formed adjacent to the chamfered portion simultaneously at the forming of the chamfered portion.

9. The manufacturing method of a roller bearing cage according to claim 1, wherein the flat portion is formed adjacent to the chamfered portion such that a length of the flat portion is at least equivalent to a displaceable distance in a thickness direction of the cage main body, said displaceable distance being defined as a distance that the roller bearing cage is displaced when the roller bearing cage is mounted between an outer peripheral housing member and an inner peripheral side shaft member.

10. The manufacturing method of a roller bearing cage according to claim 1, wherein the flat portion extends linearly in the thickness direction on the side face.

11. The manufacturing method of a roller bearing cage according to claim 1, further comprising pressing another edge of the one of the cage pockets to form another chamfered portion, said another chamfered portion and said chamfered portion forming a pair of chamfered portions,
    wherein the flat portion is formed between the pair of said chamfered portions.

12. The manufacturing method of a roller bearing cage according to claim 11, wherein the pair of said chamfered portions is formed symmetrical and adjacent to the flat portion.

13. The manufacturing method of a roller bearing cage according to claim 11, wherein, in the radial direction of the annular plate, the flat portion protrudes on the side face of the one of the cage pockets more than the pair of said chamfered portions.

14. The manufacturing method of a roller bearing cage according to claim 11, wherein, in the radial direction of the annular plate, the flat portion protrudes on the side face of the one of the cage pockets more than other portions of the side face of the one of the cage pockets.

15. The manufacturing method of a roller bearing cage according to claim 1, further comprising pressing another edge of the one of the cage pockets to form another chamfered portion, said another chamfered portion and said chamfered portion forming a pair of chamfered portions,
wherein the pair of said chamfered portions is formed symmetrical with respect to the flat portion.

16. The manufacturing method of a roller bearing cage according to claim 1, further comprising pressing another edge of the one of the cage pockets to form another chamfered portion that extends with an inclined angle from an edge of the flat portion.

17. The manufacturing method of a roller bearing cage according to claim 15, wherein, in the cross sectional view, the flat portion is located in a central portion of the edge of said one of the cage pockets, and the chamfered portion and said another chamfered portion are located in sides of the central portion of the edge of said one of the cage pockets.

18. The manufacturing method of a roller bearing cage according to claim 15, wherein, in the cross sectional view, the flat portion is located in a central portion of the edge of said one of the cage pockets, and the chamfered portion and said another chamfered portion extend symmetrically with respect to the flat portion from edges of the central portion.

19. The manufacturing method of a roller bearing cage according to claim 16, wherein, in the cross sectional view, the flat portion is located in a central portion of the edge of said one of the cage pockets, and the chamfered portion and said another chamfered portion extend from edges of the central portion of the edge of said one of the cage pockets.

20. The manufacturing method of a roller bearing cage according to claim 16, wherein, in the cross sectional view, the flat portion is located in a central portion of the edge of said one of the cage pockets, and the chamfered portion and said another chamfered portion extend symmetrically with respect to the flat portion from edges of the central portion.

* * * * *